United States Patent
Mueck et al.

(10) Patent No.: US 9,565,658 B2
(45) Date of Patent: Feb. 7, 2017

(54) DYNAMIC SELECTION OF SPECTRUM ACCESS IN A SPECTRUM SHARING CONTEXT

(71) Applicants: Intel Mobile Communications GmbH, Neubiberg (DE); Intel Corporation, Santa Clara, CA (US)

(72) Inventors: Markus Dominik Mueck, Neubiberg (DE); Reza Arefi, Great Falls, VA (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 13/736,177

(22) Filed: Jan. 8, 2013

(65) Prior Publication Data

US 2014/0192685 A1  Jul. 10, 2014

(51) Int. Cl.
  *H04W 72/04* (2009.01)
  *H04L 5/14* (2006.01)

(52) U.S. Cl.
  CPC ............ *H04W 72/04* (2013.01); *H04L 5/1469* (2013.01)

(58) Field of Classification Search
  CPC ...... H04W 72/00; H04W 72/02; H04W 72/04; H04W 72/044; H04W 72/0453; H04W 72/048; H04W 72/0493; H04W 72/08; H04W 72/082
  See application file for complete search history.

(56) References Cited

U.S. PATENT DOCUMENTS

| 7,953,412 B2 * | 5/2011 | Lee ..................... H04L 12/5695 455/436 |
| 2007/0253466 A1 * | 11/2007 | Jones .................... H04W 16/14 375/131 |
| 2011/0274014 A1 | 11/2011 | Du et al. |

(Continued)

FOREIGN PATENT DOCUMENTS

EP    2 262 324 A1    12/2010

OTHER PUBLICATIONS

International Search Report and Written Opinion received for PCT Patent Application No. PCT/US2014/010722, mailed on Apr. 28, 2014, 16 pages.

(Continued)

*Primary Examiner* — Chi H Pham
*Assistant Examiner* — Weibin Huang
(74) *Attorney, Agent, or Firm* — Alpine Technology Law Group LLC (57) ABSTRACT

Briefly, in accordance with one or more embodiments, a wireless system may be controlled to operate via time-division duplexing (TDD) in a first mode and operate via frequency-division duplexing (FDD) in a second mode. The mode of operation may be selected based at least in part on the available spectrum not utilized by a primary spectrum holder (PSH) in the vicinity of the wireless system. In one or more embodiments, control of operation between TDD and FDD, or between different realizations of the same duplex scheme, may be implemented by a cloud spectrum broker/controller, and in one or more alternative embodiments, control of operation between TDD and FDD may be implanted by the operator of the wireless system as an alternative spectrum holder (ASH).

18 Claims, 11 Drawing Sheets

(56) References Cited

U.S. PATENT DOCUMENTS

2011/0310776 A1    12/2011   Edwards
2012/0218922 A1     8/2012   Klingenbrunn et al.
2012/0257552 A1    10/2012   Chen et al.

OTHER PUBLICATIONS

International Preliminary Report on Patentability, International Application No. PCT/US2014/010722, mailed Jul. 23, 2015, 12 pages.

* cited by examiner

DYNAMIC SELECTION OF SPECTRUM ACCESS IN A SPECTRUM SHARING CONTEXT

BACKGROUND

Licensed Shared Access (LSA) was recently developed by the European Radio Spectrum Policy Group (RSPG) to propose a new way for answering to the mobile operators' needs for more spectrum. Indeed, it is expected that no more dedicated spectrum will be available for cellular operators for mobile communications in the future. In order to address this, LSA proposes mechanisms for introducing shared spectrum based solutions, for example mobile cellular operators will have access to additional licensed spectrum from other licensees such as public safety, government, and so on, to which mobile cellular operators normally would not get access. Another approach to shared spectrum is Authorized Shared Access (ASA). ASA, however, is limited to IMT spectrum whereas LSA also addresses non-IMT bands. LSA and ASA are currently only at the conceptual level. Another related technology is called Cloud Spectrum Services (CSS) which addresses the same framework as LSA and ASA, but introduces more detailed implementation solutions. It should be noted that the approaches of LSA/ASA/CSS are merely examples of shared spectrum access.

The approaches of LSA/ASA/CSS will introduce mechanisms for enabling Mobile Devices (MDs) to share spectrum under a licensed regime. For example, following the CSS concept, the spectrum may be allocated based on various time-scales, ranging from static up to a highly dynamic allocation of shared spectrum. One issue of spectrum sharing, however, lies in the fact that a primary user, typically, the spectrum owner, the incumbent, can choose to reclaim any of its spectrum at any time. Also, the primary users might want to be able to allocate any parts of the considered spectrum to their own services. In such a context, the choice between Frequency-Division Duplexing (FDD) and Time-Division Duplexing (TDD) for Alternate Spectrum Holders (ASHs), such as Long Term Evolution (LTE) in the current 2.3-2.4 GHz band, typically depends on the behavior such as the spectrum usage characteristics of the primary user, the incumbent. In some contexts, FDD use may refer to paid operation, and TDD use may refer to unpaired operation. Paired operation may indicate that a channel or a block of spectrum in a lower frequency may be associated with a channel or a block of spectrum in a higher frequency, typically separated by a duplex distance, for example an uplink channel block and a downlink channel block, whereas unpaired may indicate no such association. Furthermore, TTD use may be implemented in either unpaired or unpaired operation. It should be noted that sometimes the primary user may temporarily grant exclusive or quasi-exclusive use of spectrum to an alternate spectrum holder during a licensed period in which the alternate spectrum holder or user may have the same rights to the spectrum as the primary spectrum holder such that the alternate user has primary or quasi-primary rights to the spectrum during such use. Current documents on LSA/ASA/CSS do not foresee any intelligent management of FDD/TDD spectrum access. Also, other dedicated spectrum based technologies do not dynamically change between an FDD/TDD type of spectrum access. Consequently, the legacy solutions rely on a fixed, pre-defined FDD or TDD spectrum access. In a non-static spectrum sharing context, such a fixed solution can either lead to a poor exploitation of the available resources or even to the worst case that the concerned spectrum resources cannot be used for a target service.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
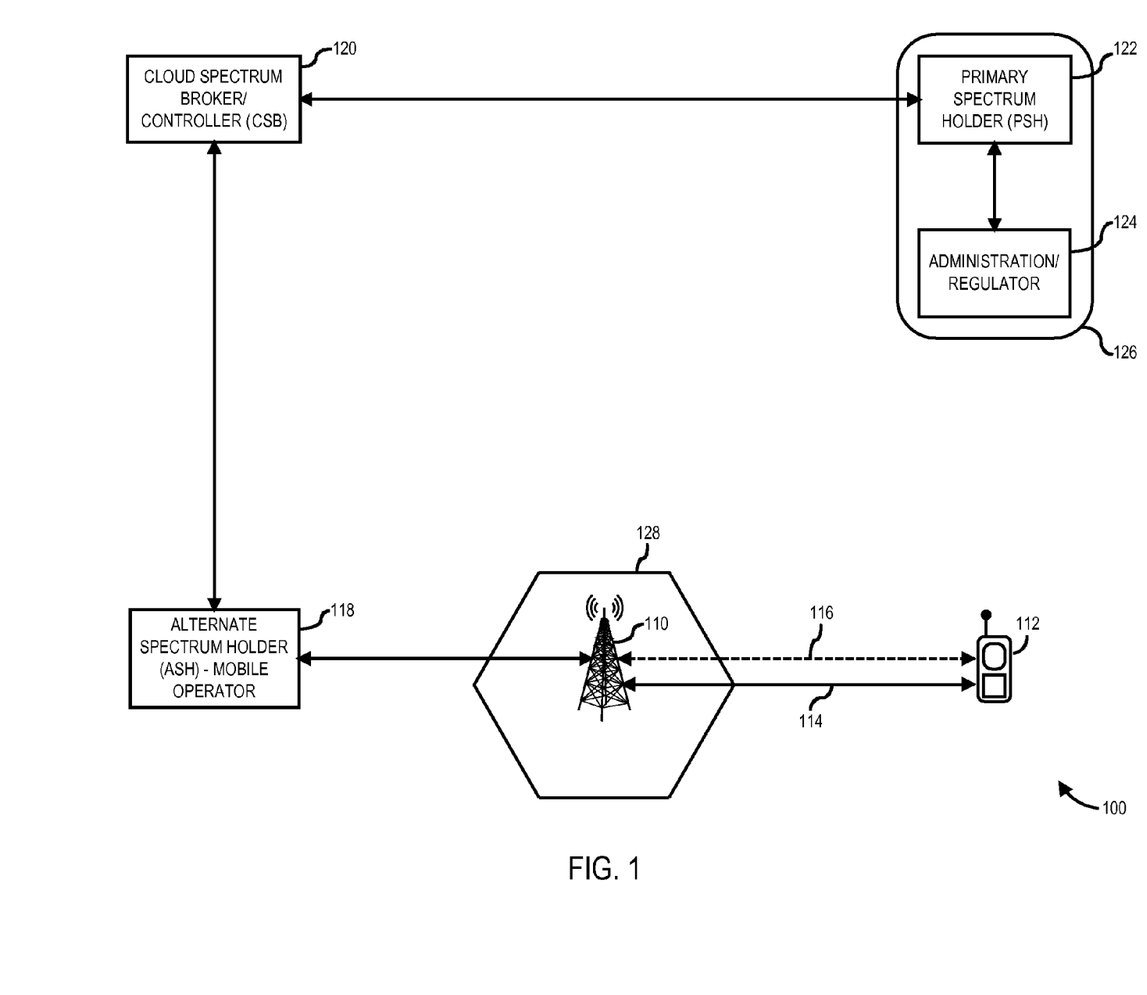
FIG. 1 is a diagram of a cloud spectrum services (CSS) ecosystem including an access controller referred to as a cloud spectrum broker/controller (CSB) in accordance with one or more embodiments.

Referring now to FIG. 1, a diagram of a cloud spectrum services (CSS) ecosystem including a cloud spectrum broker/controller (CSB) in accordance with one or more embodiments will be discussed. It should be noted that the ecosystem and its various components and network elements shown in FIG. 1 is discussed herein and throughout the text for purposes of example, wherein the concept shown in FIG. 1 may apply to other wireless technologies capable of frequency-division duplexing (FDD) and time-division duplexing (TDD), and the scope of the claimed subject matter is not limited in this respect. As shown in FIG. 1, system 100 may comprise an enhanced Node B (eNB) 110 in communication with user equipment (UE) 112 via operator spectrum 114 for the operator of the network to which eNB 110 belongs, for example a mobile network 128. The UE 112 may be a cloud spectrum services (CSS) capable multi-mode device (MMD) that is capable of operating via CSS spectrum 116 allocated via a cloud spectrum broker/controller (CSB) 120. A broker/controller may refer to a broker, a controller, or a combination of a broker and a controller, and the scope of the claimed subject matter is not limited in this respect. Depending on the nature of network 100, CSB 120 may comprise a broker/controller for a CSS system, or alternatively for a Licensed Shared Access (LSA) system or an Authorized Shared Access (ASA) system, wherein the term controller may be utilized rather used instead of a broker/controller in the context of an LSA/ASA system, and the scope of the claimed subject matter is not limited in this respect. The CSB 120 manages spectrum sharing between a primary spectrum holder (PSH) 122 and an alternate spectrum holder (ASH) 118 which may be the operator of mobile network 128. The PSH 122 may make CSS spectrum available to the ASH 118 based on spectrum sharing rules that are managed by an administrator or regulator 126 for the network 126 to which the PSH 122 belongs. In such a LSA/ASA/CSS based system 100, it is expected that CSB 120 manages and/or oversees the availability of the spectrum of the PSH 122 in a given geographic area for a given time. In one or more embodiments, the CSB 120 may dynamically allocate spectrum of the PSH 122 for use by mobile devices or UEs 112 of the ASH 118. The spectrum to be used by ASH 118 may indeed depend on the geographic location of system 100, and/or the spectrum use maybe limited to a given time interval. In accordance with one or more embodiments, system 100 may be modified to include additional entities to efficiently deal with dynamic Frequency-Division Duplexing (FDD) spectrum access and/or Time-Division Duplexing (TDD) spectrum access and selection as shown in further detail with respect to FIG. 2 and FIG. 3, below.

Figure 2:
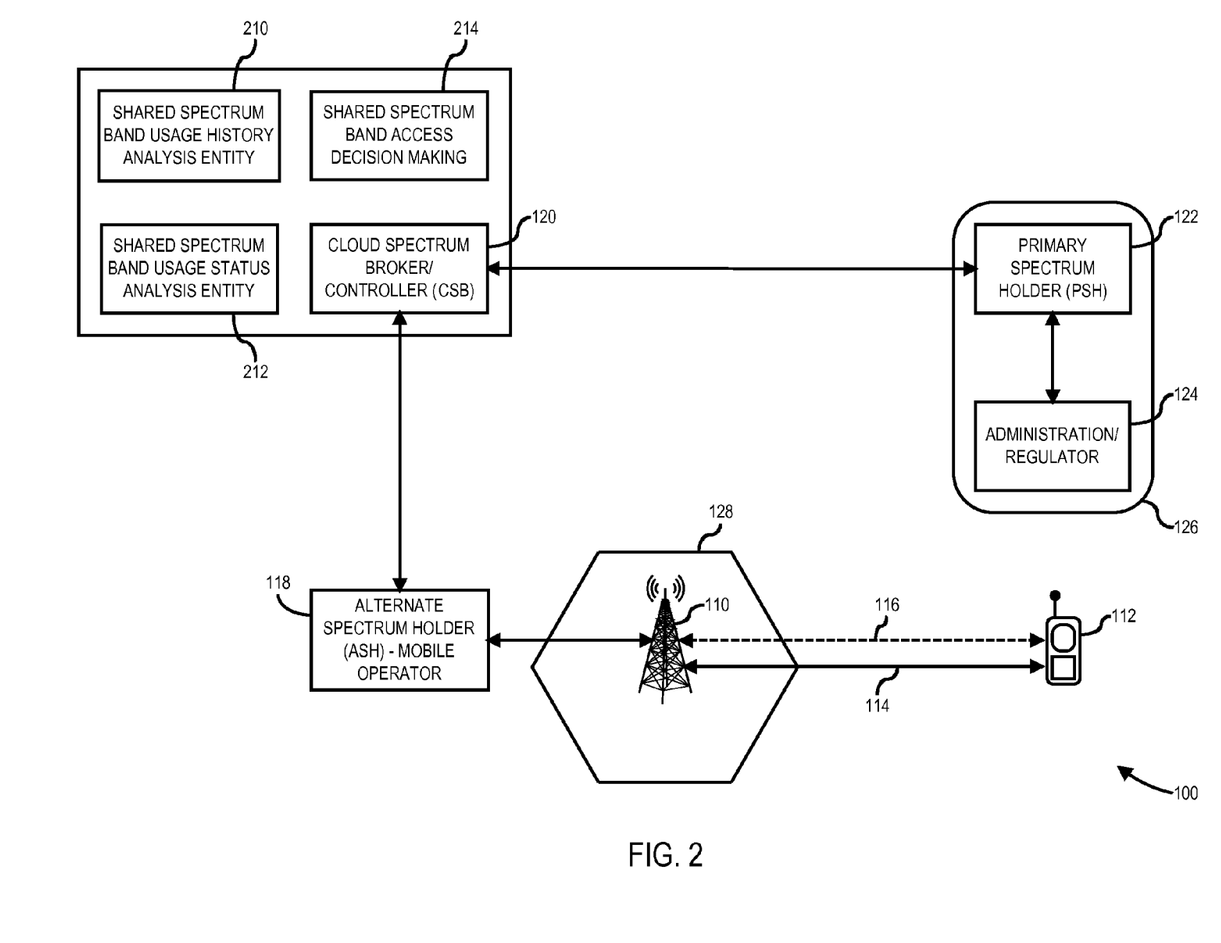
FIG. 2 is a diagram of a cloud spectrum services (CSS) ecosystem including a cloud spectrum broker/controller (CSB) and frequency-division duplexing (FDD)/time-division duplexing (TDD) control entities in the CSB in accordance with one or more embodiments.

Referring now to FIG. 2, a diagram of a cloud spectrum services (CSS) ecosystem including a cloud spectrum broker/controller (CSB) and frequency-division duplexing (FDD)/time-division duplexing (TDD) control entities in the CSB in accordance with one or more embodiments will be discussed. As shown in FIG. 2, system 100 of FIG. 1 is modified to include additional entities at the Cloud spectrum broker/controller (CSB) 120 for dealing with dynamic Frequency-Division Duplexing (FDD) spectrum access and/or Time-Division Duplexing (TDD) spectrum access and selection. A Shared Spectrum Band Usage History Analysis Entity 212 observes the past behavior in the spectrum of primary spectrum holder (PSH) 122. There are several ways for determining such past behavior in the spectrum usage of PSH 122. In one embodiment, the CSB 120 is typically informed by the PSH 122 about the availability of spectrum to be shared. This knowledge can be gathered over a time interval in order to have sufficient statistics on the past behavior of the PSH 122. In another embodiment, in case the statistics that need to be obtained are not controlled by the concerned CSB 120, centralized or distributed sensing may be applied in order to gather the required information. Both of the above approaches would derive sufficient statistics for a geographical region, wherein information gathering techniques are applied to each of the geographical regions independently. In particular, the typical signal shapes such as bandwidth, output power levels, and so on, and usage levels of various portions of the spectrum of the PSH 122 are observed based on the above information gathering techniques, and then corresponding statistical measures are derived. The usage characteristics may be expressed and future usage may be predicted via application of Markov Chains, Kalman Filters, linear prediction, genetic prediction algorithms, random walk processes, look-up tables based on previous data, and so on, and the scope of the claimed subject matter is not limited in this respect.

Looking at the historical data of CSB 120 as well as real-time data received from PSH 122, the Shared Spectrum Band Usage Status Analysis Entity 212 flags any upcoming change of band usage of PSH 122 in case that the PSH 122 reclaims a portion or all of the concerned shared spectrum. As a result, the Shared Spectrum Band Usage Status Analysis Entity 212 has the corresponding knowledge which is typically obtained by suitable interactions with the spectrum usage database service of CSB 120.

Figure 3:
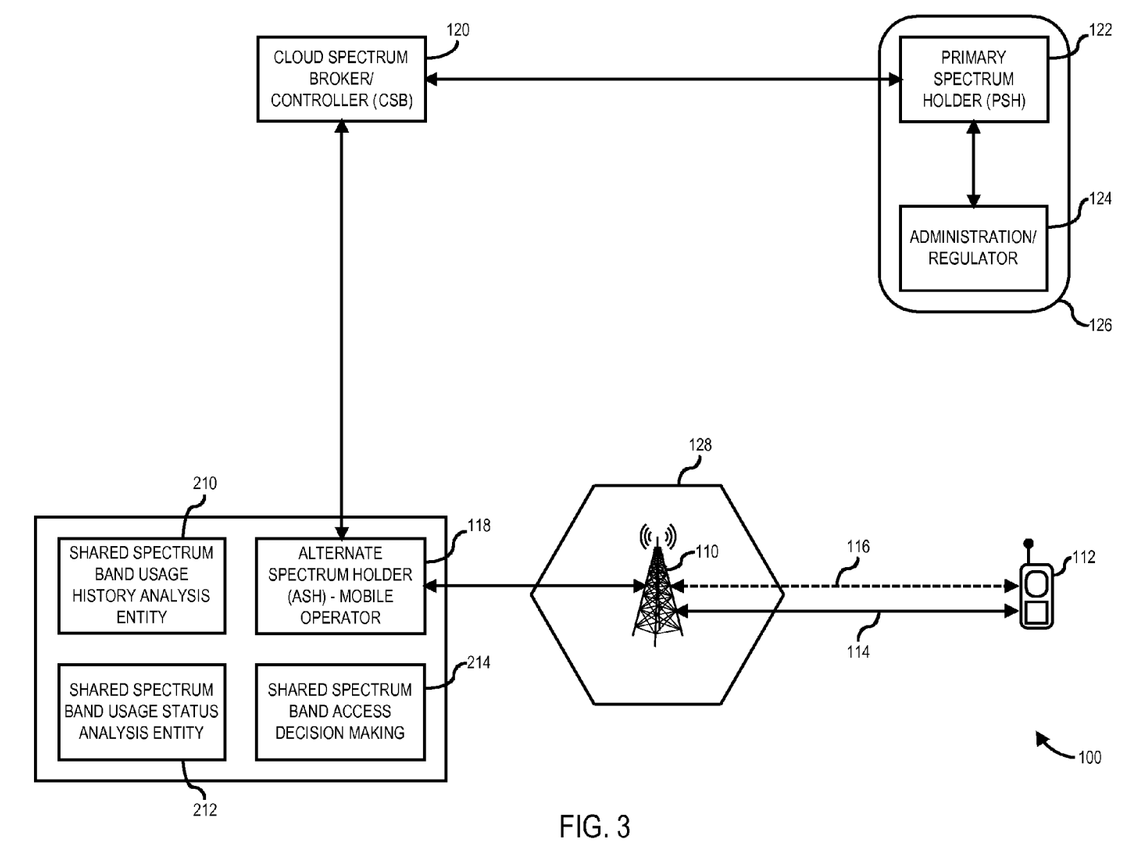
FIG. 3 is a diagram of a cloud spectrum services (CSS) ecosystem including a cloud spectrum broker/controller (CSB) and frequency-division duplexing (FDD)/time-division duplexing (TDD) control entities in the alternate spectrum holder (ASH) in accordance with one or more embodiments.

Based at least in part on the inputs obtained from the Shared Spectrum Band Usage History Analysis Entity 210 and the Shared Spectrum Band Usage Status Analysis Entity 212, the Shared Spectrum Band Access Decision Making Entity 214 decides between FDD and TDD access to the band described in further detail herein, below. Furthermore, in one or more embodiments a joint usage of FDD and TDD is possible in a carrier aggregation context. In one or more embodiments as shown in FIG. 3, Cloud spectrum broker/controller 120 based FDD/TDD selection utilized in the case that the choice on FDD/TDD is done at a point in time when spectrum is allocated to alternate spectrum holders (ASHs) 118, also referred to as secondary users. In such a case, the FDD/TDD selection choice may not be modified over the allocation time and the concerned geographic area. Due to the close attachment of the Shared Spectrum Band Usage Status Analysis Entity 210 to the database of the Cloud spectrum broker/controller 120, the Shared Spectrum Band Usage Status Analysis Entity 212 may have full access to up-to-date information on intended spectrum usage by the Primary Spectrum Holder 122.

Referring now to FIG. 3, a diagram of a cloud spectrum services (CSS) ecosystem including a cloud spectrum broker/controller (CSB) and frequency-division duplexing (FDD)/time-division duplexing (TDD) control entities in the alternate spectrum holder (ASH) in accordance with one or more embodiments will be discussed. As shown in FIG. 3, system 100 of FIG. 1 is modified to include additional entities at the Alternate Spectrum Holder (ASH) 118 for dealing with dynamic Frequency-Division Duplexing (FDD) spectrum access and/or Time-Division Duplexing (TDD) spectrum access selection and transition. In the embodiment of FIG. 3, Alternate Spectrum Holder 118 based FDD/TDD selection may be utilized in the case that the choice on FDD/TDD could change dynamically at a relatively high pace.

Figure 4:
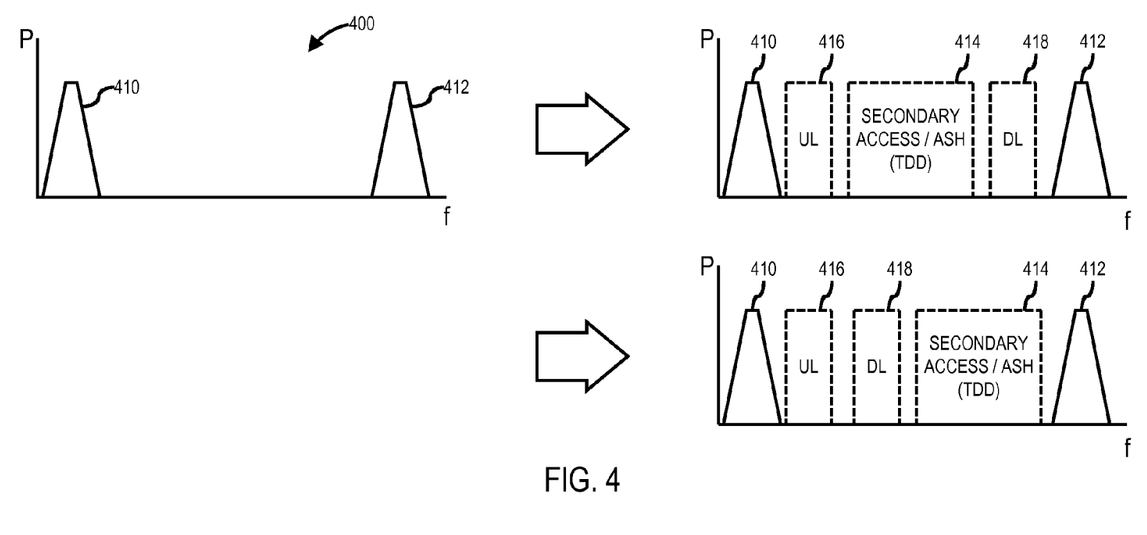
FIG. 4 is a spectrum diagram illustrating frequency-division duplexing (FDD) spectrum access being selected in the case of a large available spectrum portion along with time-division duplexing (TDD) in accordance with one or more embodiments.

Referring now to FIG. 4, a spectrum diagram illustrating frequency-division duplexing (FDD) spectrum access being selected in the case of a large available spectrum portion along with time-division duplexing (TDD) in accordance with one or more embodiments will be discussed. For purposes of example, the spectrum may be represented by a graph of signal power (P) versus frequency (f) wherein the frequency axis may span part of or the entire licensed spectrum of the alternate spectrum holder (ASH) 118 being available for shared access. In FIG. 4 through FIG. 10 as shown herein, example spectrum masks are shown for the primary spectrum holders wherein out-of-band emission levels are outlined by slightly diagonal lines at either end of the useful spectrum. For the alternate users, the spectrum usage is shown as ending abruptly at the edges of the useful spectrum without showing any out of band usage. It is noted that the spectrum use shown in FIG. 4 through FIG. 10 are thus for purposes of example, wherein other spectrum masks or usage may exit, and the scope of the claimed subject matter is not limited in this respect. As previously discussed, with the CSB 120 based FDD/TDD selection of FIG. 2, the choice on FDD/TDD may be done when spectrum is allocated to ASHs 118 (secondary users), and with the ASH 118 based FDD/TDD selection of FIG. 3, the choice on FDD/TDD is changed dynamically at a high pace. In the embodiments represented by FIG. 2, the choice on FDD/TDD may depend on the preferences of the ASH 118, for example if the ASH 118 prefers TDD or FDD, and/or the frequency location of the available slots, and several typical examples for the proposed selection process are illustrated herein, below. It should be noted that the examples described herein are provided for purposes of illustration and merely represent typical examples which may be taken as a reference to any possible configuration of system 100, and the scope of the claimed subject matter is not limited in this respect.

As shown in FIG. 4, where a large portion of spectrum is available for an alternate spectrum holder (ASH) 118, the following rules may be applied, unless the choice of FDD or TDD is mandated by the underlying local and/or regional regulations which may take precedence over PSH and/or ASH preferences. First, Time-Division Duplexing (TDD) versus Frequency-Division Duplexing (FDD) may be chosen based at least in part on preferences of the ASH 118. Second, allocation of TDD should be done in such a way that the usage of FDD is still possible for other ASHs 118 if so desired. Such a principle is illustrated in FIG. 4. The plot 400 of power versus frequency shows band 410 and band 412 occupied by Primary Spectrum Holder (PSH) 122 that allows spectrum between bands 410 and 412 to be utilized for alternate access by ASH 118 for TDD access band 414. The bandwidth of TDD access band 414 may be designed to allow FDD access via uplink (UL) band 416 and downlink (DL) band 418 separated by TDD access band 414. Alternatively, UL band 416 and DL band 418 may be disposed adjacent to one another outside of TDD access band 414, for example as shown in FIG. 4 with UL band 416 and DL band 418 preceding TDD access band 414, although typically FDD configurations may require a suitable separation between UL band 416 and DL band 418, and the scope of the claimed subject matter is not limited in this respect.

Figure 5:
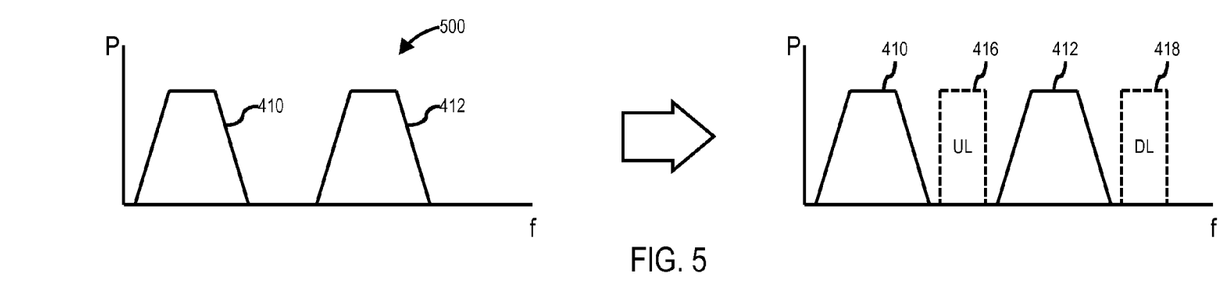
FIG. 5 is a spectrum diagram illustrating frequency-division duplexing (FDD) spectrum access being selected in the case of small available spectrum portions in accordance with one or more embodiments.

Referring now to FIG. 5, a spectrum diagram illustrating frequency-division duplexing (FDD) spectrum access being selected in the case of small available spectrum portions in accordance with one or more embodiments will be discussed. In the case shown in FIG. 5 where only relatively small spectrum portions may be available in between PSH band 410 and PSH band 412, or the case where TDD operation in between PSH band 410 and PSH band 412 may not be possible for technical, regulatory, or other reasons, an entire available slot between the PSH bands 410 and 412 may be utilized the uplink (UL) band 416 followed by another entire slot for the downlink (DL) band following PSH band 412 as illustrated.

Figure 6:
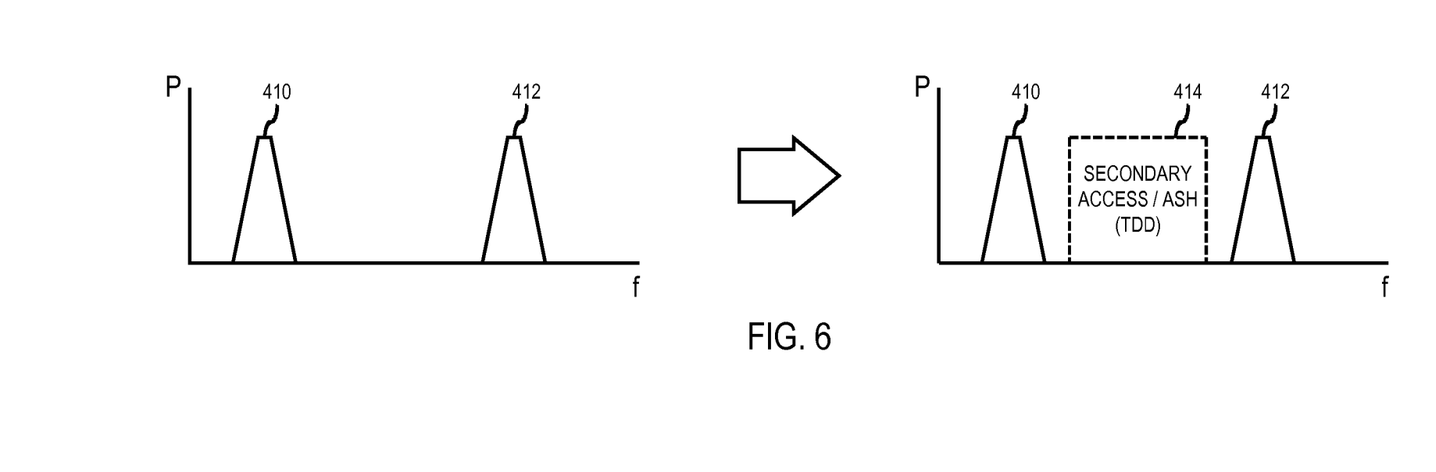
FIG. 6 is a spectrum diagram illustrating time-division duplexing (TDD) spectrum access being selected in the case a contiguous spectrum portion in accordance with one or more embodiments.

Referring now to FIG. 6, a spectrum diagram illustrating time-division duplexing (TDD) spectrum access being selected in the case a contiguous spectrum portion in accordance with one or more embodiments will be discussed. In case shown in FIG. 6 where only a contiguous spectrum portion or small neighboring spectrum portions may be are available, the available slot between PSH band 410 and 412 may be utilized in its entirety, or nearly in its entirety, provided there is enough separation to mitigate harmful interference between blocks, for TDD spectrum access with TDD access band 414 for access by the Alternate Spectrum Holder (ASH) 118.

Figure 7:
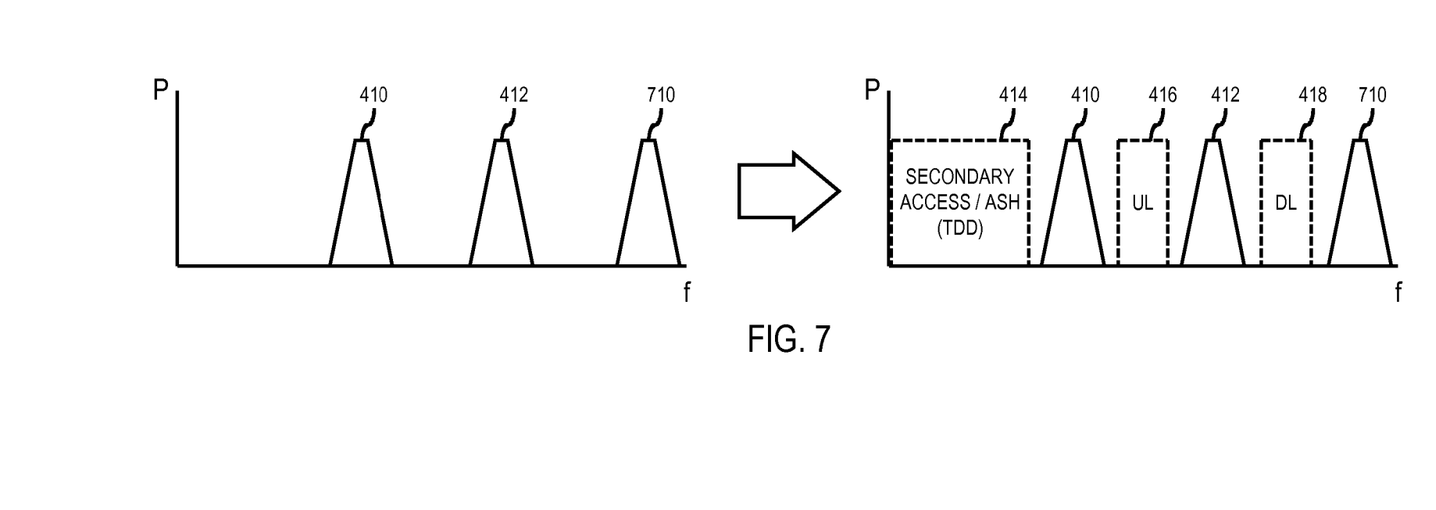
FIG. 7 is a spectrum diagram illustrating hybrid frequency-division duplexing (FDD)/time-division duplexing (TDD) spectrum access being selected in accordance with one or more embodiments.

Referring now to FIG. 7, a spectrum diagram illustrating hybrid frequency-division duplexing (FDD)/time-division duplexing (TDD) spectrum access being selected in accordance with one or more embodiments will be discussed. In the case shown in FIG. 7, a combination of both a large spectrum may be available preceding PSH band 410, but a smaller, varying and/or differing spectrum usage may be available between PSH band 410, PSH band 412 and/or PSH band 710. In general, any difference in spectrum usage may indicate a change in spectrum access by the PSH. In such a case, a secondary or alternate user may be granted simultaneous access to both an FDD and a TDD band as shown where a TDD access band 414 may be provided lower in frequency before PSH band 410, and FDD access may be provided via UL band 416 disposed between PSH band 410 and PSH band 412, and via DL band 418 disposed between PSH band 412 and PSH band 710. In one or more embodiments, FDD and TDD access may be combined via carrier aggregation techniques, although the scope of the claimed subject matter is not limited in this respect.

Figure 8:
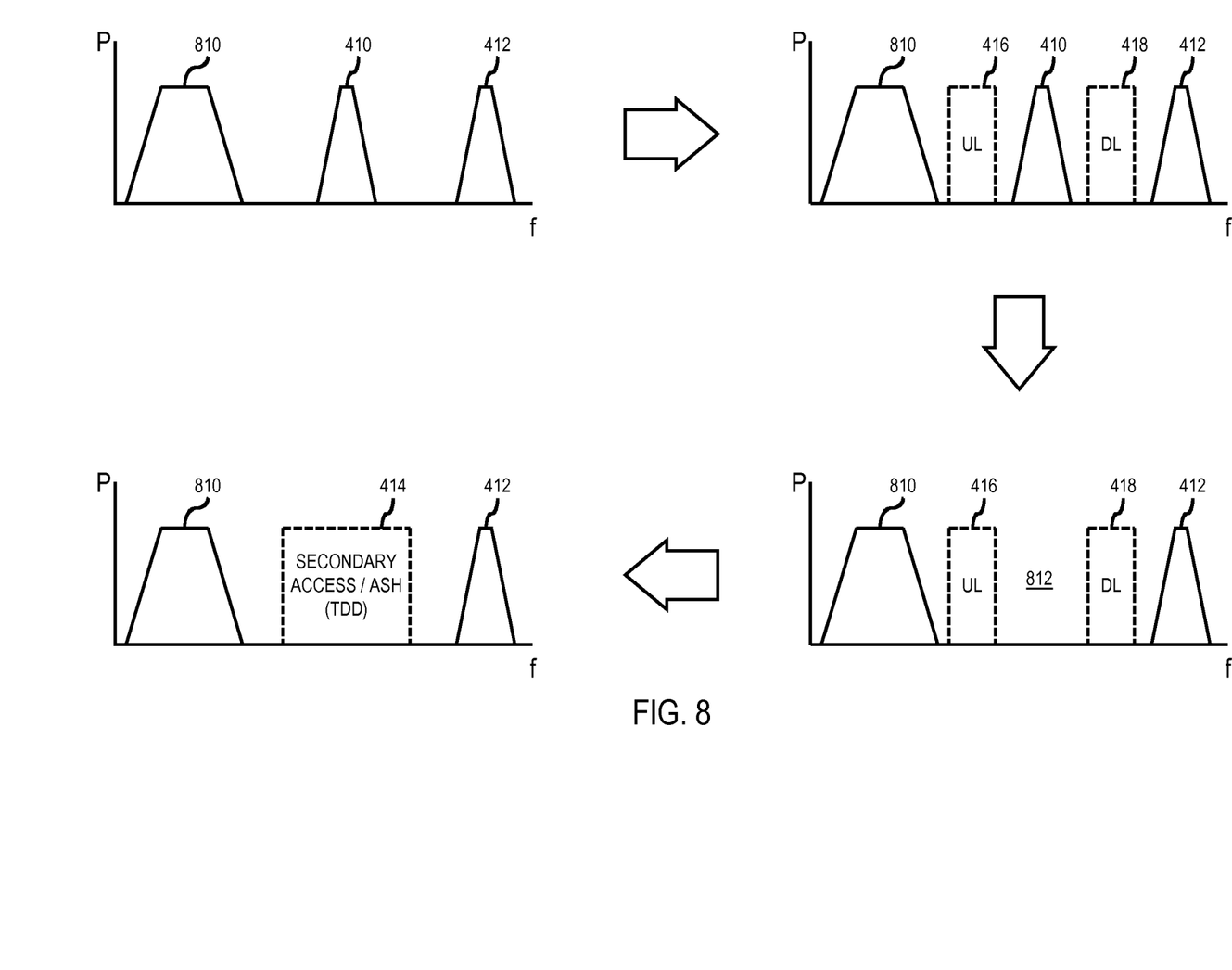
FIG. 8 is a spectrum diagram illustrating time-division duplexing (TDD) spectrum access being chosen in lieu of a frequency-division duplexing (FDD) scheme once the incumbent/primary spectrum holder (PSH) user liberates a portion of the spectrum in accordance with one or more embodiments.

Referring now to FIG. 8, a spectrum diagram illustrating time-division duplexing (TDD) spectrum access being chosen in lieu of a frequency-division duplexing (FDD) scheme once the incumbent/primary spectrum holder (PSH) user liberates a portion of the spectrum in accordance with one or more embodiments will be discussed. In the embodiments represented by FIG. 3 where the choice on FDD/TDD may be changed dynamically at a relatively high pace, the PSH 122 dynamically may liberate and/or reclaims spectrum portions over time. In such embodiments, several typical examples for the proposed selection process are illustrated herein, below. It should be noted that the examples described herein are provided for purposes of illustration and merely represent typical examples which may be taken as a reference to any possible configuration of system 100, and the scope of the claimed subject matter is not limited in this respect.

As shown in FIG. 8 in the case that a portion of the spectrum of PSH 122 is freed, for example where spectrum is no longer used by the incumbent or PSH 122 and the spectrum can be allocated to an ASH 118, a previous FDD spectrum access choice may be switched to TDD access. For example, wherein spectrum is occupied by PSH band 810, PSH band 410 and PSH band 412, FDD access by an ASH 118 may be provided via UL band 416 disposed between PSH band 810 and PSH band 410, and via DL band 418 disposed between PSH band 410 and PSH band 412. In the event that the spectrum is no longer used by PSH band 410 such that a spectrum portion 812 is available between PSH band 810 and PSH band 412, spectrum access may be switched from FDD to TDD in the freed spectrum portion 812 by utilizing a TDD access band 414 to more efficiently utilize the available spectrum portion 812. Such an embodiment may be implemented for example wherein TDD is preferred by the ASH 118, and/or where the freed spectrum portion 812 was previously separating the UL band 416 and the DL band 418 during FDD access.

Figure 9:
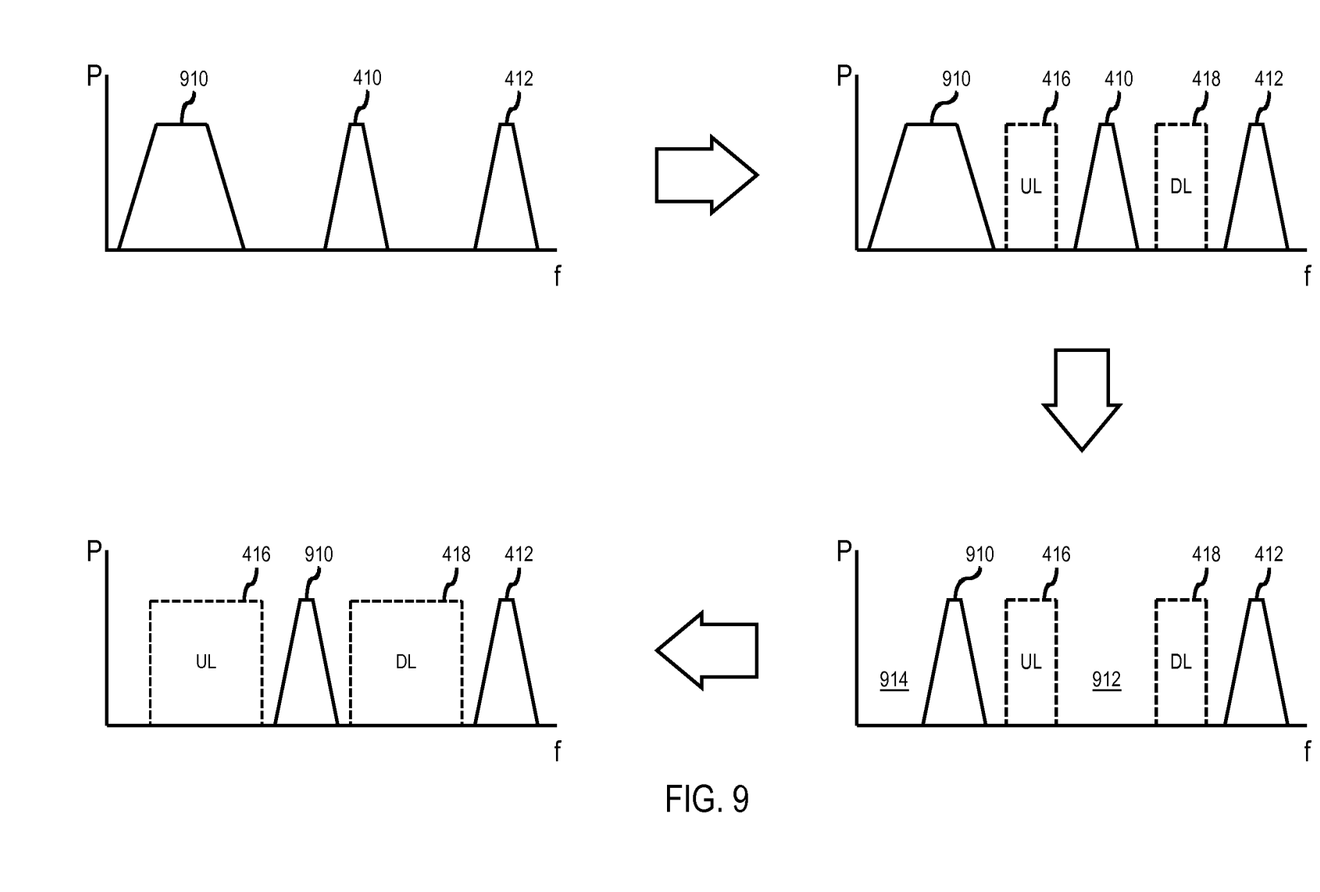
FIG. 9 is a spectrum diagram illustrating frequency-division duplexing (FDD) spectrum access being maintained with an increase in bandwidth and potentially a shift in carrier frequencies once the incumbent/primary spectrum holder (PSH) user liberates a portion of the spectrum in accordance with one or more embodiments.

Referring now to FIG. 9, a spectrum diagram illustrating frequency-division duplexing (FDD) spectrum access being maintained with an increase in bandwidth and potentially a shift in carrier frequencies once the incumbent/primary spectrum holder (PSH) user liberates a portion of the spectrum in accordance with one or more embodiments will be discussed. As shown in FIG. 9, in contrast to switching from FDD to TDD as shown in FIG. 8, the user may maintain FDD access, and the bock size allocated for UL band 418 may be increased. For example, where spectrum that was once occupied by PSH band 410 is freed to provide an available spectrum portion 912, and/or where less spectrum is used by PSH band 910 thereby freeing up an available spectrum portion 914, a previous FDD spectrum access choice may be increased to a larger utilization of the UL band 416 in the spectrum below PSH band 910, and a larger utilization of the DL band 418 in the spectrum between PSH band 910 and PSH band 412. Such an embodiment may be implemented for example where FDD is preferred by the ASH 118, and/or where the freed portion of the spectrum that was previously separating the UL band 416 and the DL band 418 has increased.

Figure 10:
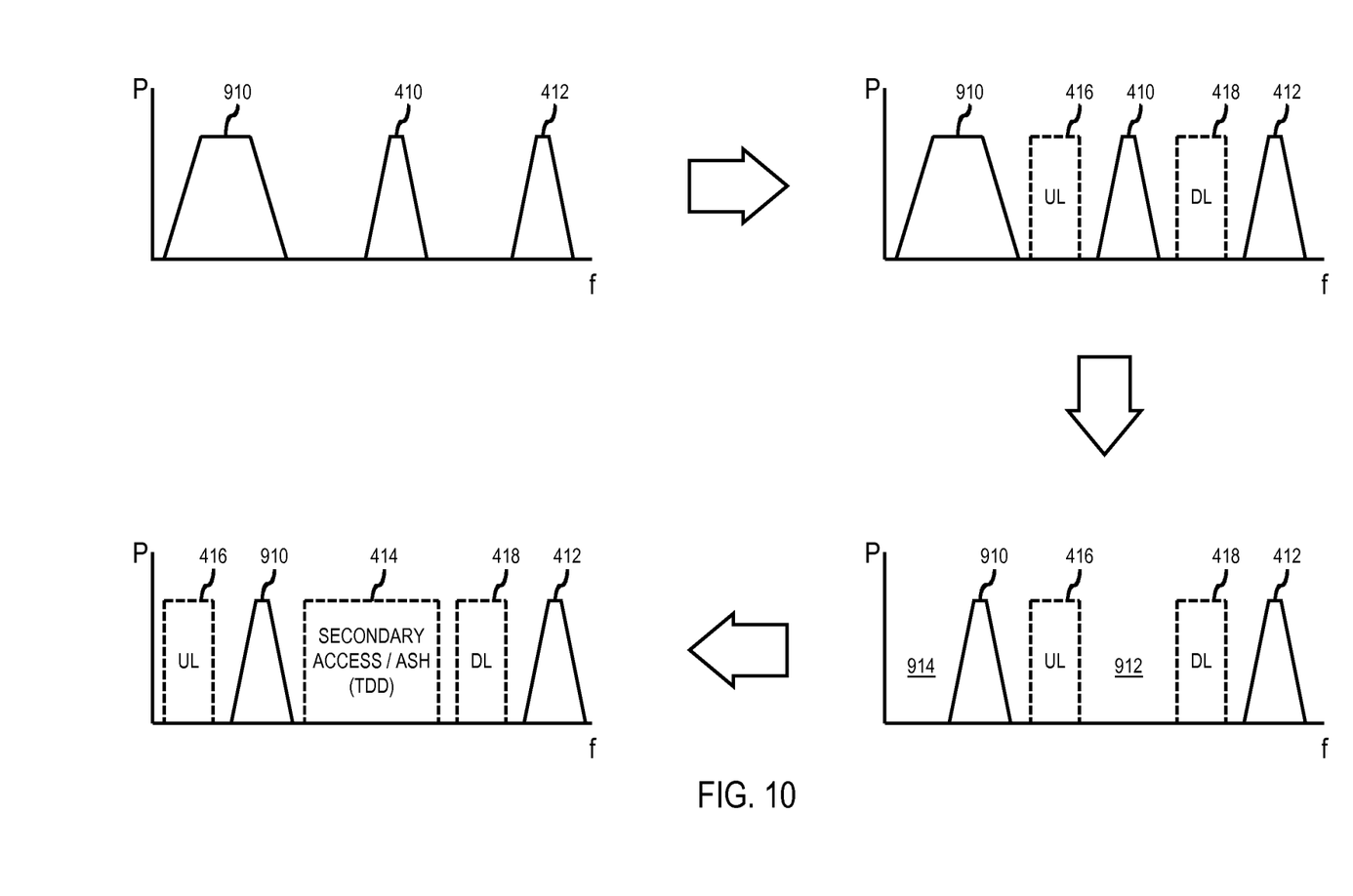
FIG. 10 is a spectrum diagram illustrating a time-division duplexing (TDD) access block being introduced in addition to a frequency-division duplexing (FDD) scheme once the incumbent/primary spectrum holder (PSH) user liberates a portion of the spectrum in accordance with one or more embodiments.

Referring now to FIG. 10, a spectrum diagram illustrating a time-division duplexing (TDD) access block being added in addition to a frequency-division duplexing (FDD) scheme once the incumbent/primary spectrum holder (PSH) user liberates a portion of the spectrum in accordance with one or more embodiments will be discussed. In a similar situation as shown in and described with respect to FIG. 9, instead of increasing the bandwidth allocated to the UL band 416 and the DL band 418 as shown in FIG. 9, an additional TDD access block may be utilized in addition to the presently utilized FDD access. For example, where spectrum that was once occupied by PSH band 410 is freed to provide an available spectrum portion 912, and/or where less spectrum is used by PSH band 910 thereby freeing up an available spectrum portion 914, the allocation of the UL band 416 may be moved to the freed spectrum portion 914, and a TDD access block 414 may be added to the freed spectrum portion 912 to allow simultaneous TDD and FDD access by ASH 118. In one or more embodiments, simultaneous TDD and FDD access may be implemented based on a carrier aggregation scheme, and in some further embodiments access to spectrum may be dynamically switched between TDD and FDD schemes, and the scope of the claimed subject matter is not limited in these respects.

Figure 11:
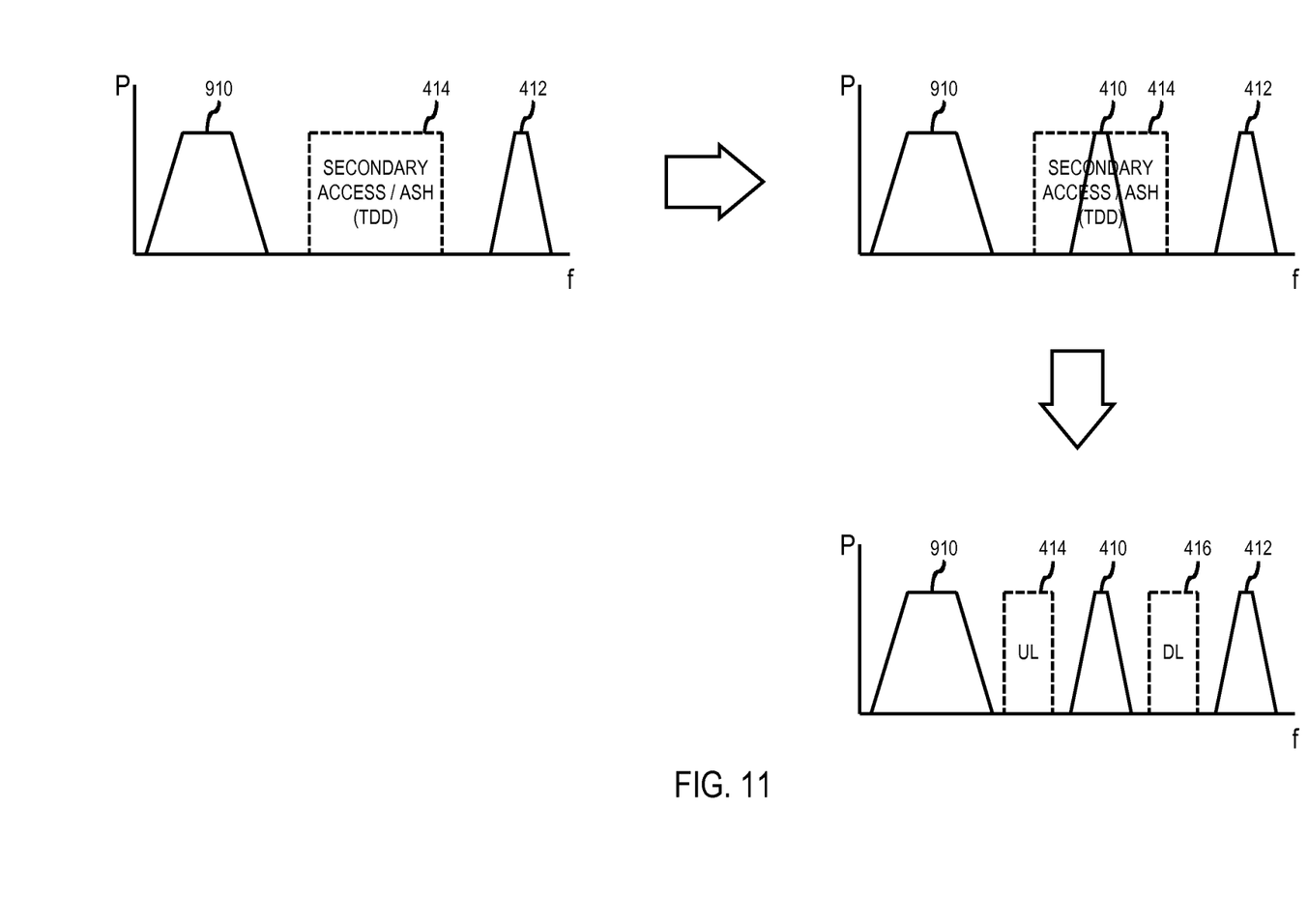
FIG. 11 is a spectrum diagram illustrating a time-division duplexing (TDD) access block being split into uplink (UL)/downlink (DL) blocks once the incumbent/primary spectrum holder (PSH) user takes back a portion of the spectrum in accordance with one or more embodiments.

Referring now to FIG. 11, a spectrum diagram illustrating a time-division duplexing (TDD) access block being split into uplink (UL)/downlink (DL) blocks once the incumbent/primary spectrum holder (PSH) user takes back or reclaims a portion of the spectrum in accordance with one or more embodiments will be discussed. As shown in FIG. 11, in the event that a portion of the concerned spectrum is reclaimed by the PSH 122, for example where spectrum previously occupied by the ASH 118 with TDD access band 414 is taken from the ASH 118 by the PSH 122 for utilization by PSH band 410, a TDD access band 414 may be split into two FDD bands comprising UL band 414 and DL band 416 separated by PSH band 410 to ensure continuity of service to the users of ASH 118 via switching from TDD to FDD.

In accordance with one or more embodiments, while the solutions for TDD and FDD selection described above may be specifically tailored to a Spectrum Sharing context, typically building on the concepts of Licensed Shared Access (LSA)/Authorized Shared Access (ASA)/Cloud Spectrum Services (CSS), it should be noted that the idea of dynamically switching between FDD/TDD operation also may be applied more generally to a non-sharing framework, for example a Third Generation Partnership Project (3GPP) Long Term Evolution (LTE) system and/or an LTE-Advanced system. Although currently such system may be operated in bands that are designated for FDD operation or TDD operation, it is expected that a more dynamic switch between FDD and TDD operation may be implemented in such systems such that the solutions described herein may be applied to such 3GPP and beyond systems. For example, an operator that normally operates with FDD may change the system operation from FDD to TDD when the traffic patterns change. Furthermore, since FDD typically allocates symmetrical resources for both the Uplink band and the Downlink band, it is possible that one of the UP or DL bands may become overloaded while the other stream is underused in an asymmetrical manner, the operator may change operation from FDD to TDD. Such a scenario may occur for example where users of a specific cell use a large amount of data traffic instead of voice communication. In such cases, the switching between TDD and FDD may be implemented in the manner illustrated in the examples discussed herein. It is noted, however, that these are merely examples of how a system may switch between TDD and FDD operation, and the scope of the claimed subject matter is not limited in these respects.

Figure 12:
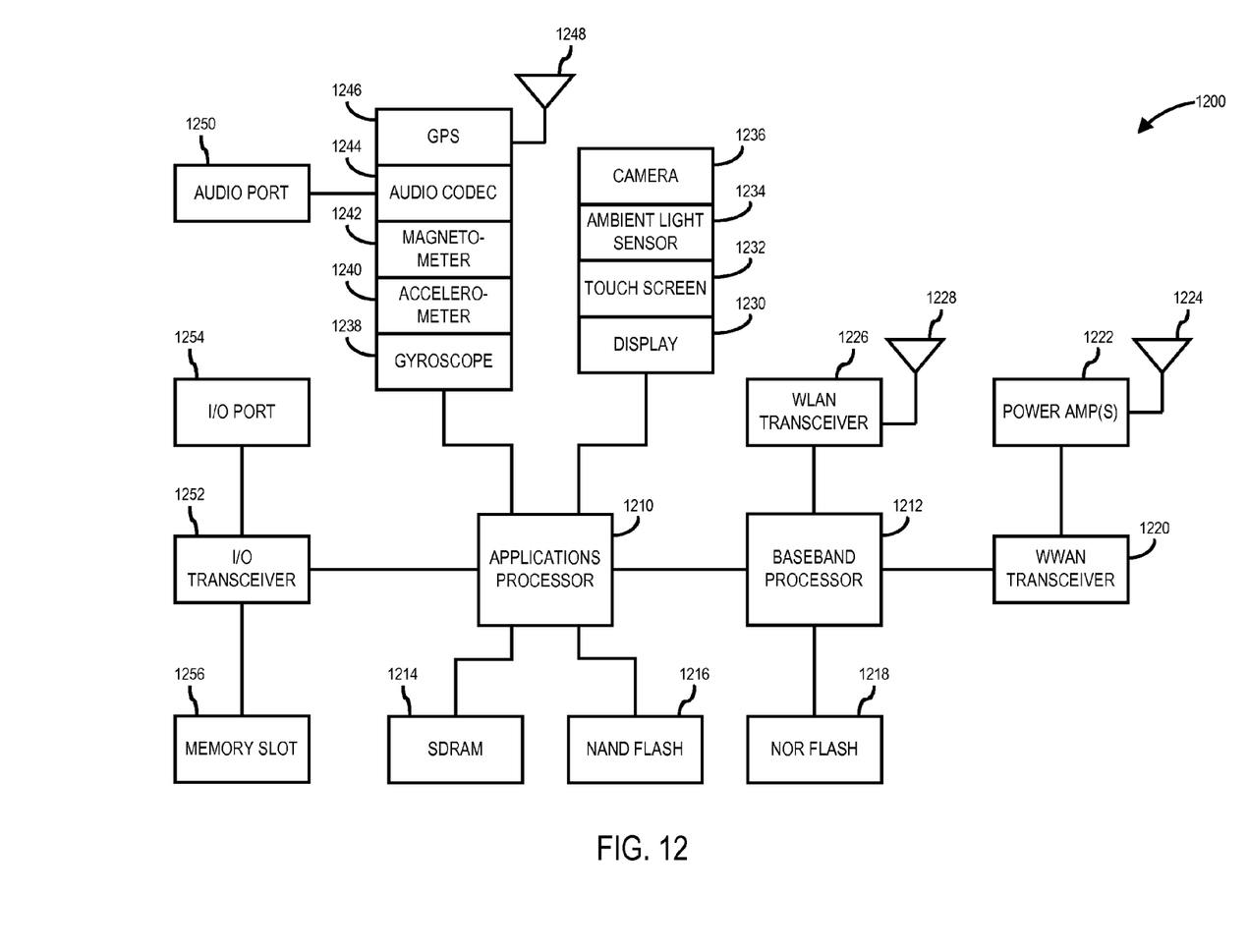
FIG. 12 is a block diagram of an information handling system capable of operating with dynamic selection of spectrum access in a spectrum sharing context in accordance with one or more embodiments.

Referring now to FIG. 12, a block diagram of an information handling system capable of operating with dynamic selection of spectrum access in accordance with one or more embodiments will be discussed. Information handling system 1200 of FIG. 12 may tangibly embody one or more of any of the network elements or devices of system 100 as shown in and described with respect to FIG. 1, FIG. 2 or FIG. 3. For example, information handling system 1200 may represent the hardware of eNB 110, UE 112, ASH 118, CSB 120, and/or PSH 122, and/or the cooperating Shared Spectrum Band Usage Analysis Entity 210, Shared Spectrum Band Usage Status Analysis Entity 212, and/or Shared Spectrum Band Access Decision Making unit 214, with greater or fewer components depending on the hardware specifications of the particular device or network element. Although information handling system 1200 represents one example of several types of computing platforms, information handling system 1200 may include more or fewer elements and/or different arrangements of elements than shown in FIG. 12, and the scope of the claimed subject matter is not limited in these respects.

In one or more embodiments, information handling system 1200 may include an applications processor 1210 and a baseband processor 1212. Applications processor 1210 may be utilized as a general purpose processor to run applications and the various subsystems for information handling system 1200. Applications processor 1210 may include a single core or alternatively may include multiple processing cores wherein one or more of the cores may comprise a digital signal processor or digital signal processing core. Furthermore, applications processor 1210 may include a graphics processor or coprocessor disposed on the same chip, or alternatively a graphics processor coupled to applications processor 1210 may comprise a separate, discrete graphics chip. Applications processor 1210 may include on board memory such as cache memory, and further may be coupled to external memory devices such as synchronous dynamic random access memory (SDRAM) 1214 for storing and/or executing applications during operation, and NAND flash 1216 for storing applications and/or data even when information handling system 1200 is powered off. In one or more embodiments, instructions to operate or configure the information handling system 1200 and/or any of its components or subsystems to operate in a manner as described herein may be stored on a non-transitory article of manufacture comprising a storage medium. In one or more embodiments, the storage medium may comprise any of the memory devices shown in and described herein, although the scope of the claimed subject matter is not limited in this respect. Baseband processor 1212 may control the broadband radio functions for information handling system 1200. Baseband processor 1212 may store code for controlling such broadband radio functions in a NOR flash 1218. Baseband processor 1212 controls a wireless wide area network (WWAN) transceiver 1220 which is used for modulating and/or demodulating broadband network signals, for example for communicating via a 3GPP LTE or LTE-Advanced network or the like as discussed herein. In general, WWAN transceiver 1220 may operate according to any one or more of the following radio communication technologies and/or standards: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WIDEN (Wideband Integrated Digital Enhanced Network), iBurst, Unlicensed Mobile Access (UMA, also referred to as also referred to as 3GPP Generic Access Network, or GAN standard). It should be noted that such standards may evolve over time, and/or new standards may be promulgated, and the scope of the claimed subject matter is not limited in this respect.

The WWAN transceiver 1220 couples to one or more power amps 1222 respectively coupled to one or more antennas 1224 for sending and receiving radio-frequency signals via the WWAN broadband network. The baseband processor 1212 also may control a wireless local area network (WLAN) transceiver 1226 coupled to one or more suitable antennas 1228 and which may be capable of communicating via a Wi-Fi, Bluetooth, and/or an amplitude modulation (AM) or frequency modulation (FM) radio standard including an IEEE 802.11a/b/g/n standard or the like. It should be noted that these are merely example implementations for applications processor 1210 and baseband processor 1212, and the scope of the claimed subject matter is not limited in these respects. For example, any one or more of SDRAM 1214, NAND flash 1216 and/or NOR flash 1218 may comprise other types of memory technology such as magnetic memory, chalcogenide memory, phase change memory, or ovonic memory, and the scope of the claimed subject matter is not limited in this respect.

In one or more embodiments, applications processor 1210 may drive a display 1230 for displaying various information or data, and may further receive touch input from a user via a touch screen 1232 for example via a finger or a stylus. An ambient light sensor 1234 may be utilized to detect an amount of ambient light in which information handling system 1200 is operating, for example to control a brightness or contrast value for display 1230 as a function of the intensity of ambient light detected by ambient light sensor 1234. One or more cameras 1236 may be utilized to capture images that are processed by applications processor 1210 and/or at least temporarily stored in NAND flash 1216. Furthermore, applications processor may couple to a gyroscope 1238, accelerometer 1240, magnetometer 1242, audio coder/decoder (CODEC) 1244, and/or global positioning system (GPS) controller 1246 coupled to an appropriate GPS antenna 1248, for detection of various environmental properties including location, movement, and/or orientation of information handling system 1200. Alternatively, controller 1246 may comprise a Global Navigation Satellite System (GNSS) controller. Audio CODEC 1244 may be coupled to one or more audio ports 1250 to provide microphone input and speaker outputs either via internal devices and/or via external devices coupled to information handling system via the audio ports 1250, for example via a headphone and microphone jack. In addition, applications processor 1210 may couple to one or more input/output (I/O) transceivers 1252 to couple to one or more I/O ports 1254 such as a universal serial bus (USB) port, a high-definition multimedia interface (HDMI) port, a serial port, and so on. Furthermore, one or more of the I/O transceivers 1252 may couple to one or more memory slots 1256 for optional removable memory such as secure digital (SD) card or a subscriber identity module (SIM) card, although the scope of the claimed subject matter is not limited in these respects.

Figure 13:
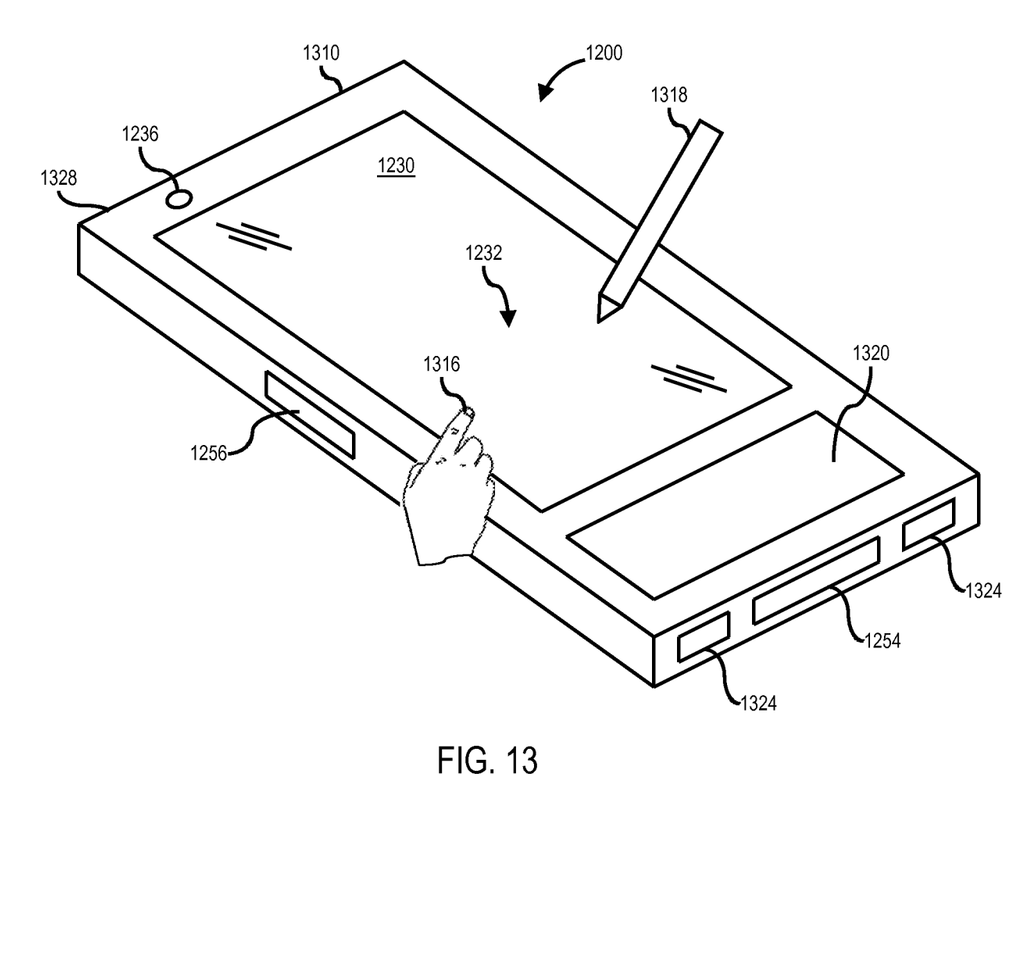
FIG. 13 is an isometric view of an information handling system of FIG. 12 that optionally may include a touch screen in accordance with one or more embodiments.

FIG. 13 is an isometric view of an information handling system of FIG. 12 that optionally may include a touch screen in accordance with one or more embodiments. FIG. 13 shows an example implementation of information handling system 1200 of FIG. 12 tangibly embodied as a cellular telephone, smartphone, or tablet type device or the like. In one or more embodiments, the information handling system 1200 may comprise any one of the infrastructure nodes, entities and/or the UE 112 of FIG. 1, FIG. 2 or FIG. 3, although the scope of the claimed subject matter is not limited in this respect. The information handling system 1200 may comprise a housing 1310 having a display 1230 which may include a touch screen 1232 for receiving tactile input control and commands via a finger 1316 of a user and/or a via stylus 1318 to control one or more applications processors 1210. The housing 1310 may house one or more components of information handling system 1200, for example one or more applications processors 1210, one or more of SDRAM 1214, NAND flash 1216, NOR flash 1218, baseband processor 1212, and/or WWAN transceiver 1220. The information handling system 1200 further may optionally include a physical actuator area 1320 which may comprise a keyboard or buttons for controlling information handling system via one or more buttons or switches. The information handling system 1200 may also include a memory port or slot 1256 for receiving non-volatile memory such as flash memory, for example in the form of a secure digital (SD) card or a subscriber identity module (SIM) card. Optionally, the information handling system 1200 may further include one or more speakers and/or microphones 1324 and a connection port 1254 for connecting the information handling system 1200 to another electronic device, dock, display, battery charger, and so on. In addition, information handling system 1200 may include a headphone or speaker jack 1328 and one or more cameras 1236 on one or more sides of the housing 1310. It should be noted that the information handling system 1200 of FIG. 13 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to dynamic selection of spectrum access in a spectrum sharing context and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A user equipment, comprising:
    a radio-frequency (RF) transceiver capable of operating via time-division duplexing (TDD) in a first mode and capable of operating via frequency-division duplexing (FDD) in a second mode; and
    a processor coupled to the RF transceiver for selecting a mode of operation of the RF transceiver to communicate with a first spectrum holder;
    the processor to select the mode of operation of the RF transceiver in response to available spectrum not utilized by a second spectrum holder other than the first spectrum holder;
    the RF transceiver further being capable of operating via simultaneous TDD and FDD operation via carrier aggregation, wherein the processor selects simultaneous TDD and FDD operation in response to receiving an indication that there is a combination of a differing amount of available spectrum not utilized by the second spectrum holder or a larger amount of continuous spectrum not utilized by the second spectrum holder.

2. The user equipment as claimed in claim 1, wherein the processor switches to a different mode of operation if the different mode better accommodates one or more requirements of the RF transceiver.

3. The user equipment as claimed in claim 1, wherein the processor selects the first mode in response to receiving an indication that a larger amount of continuous available spectrum is not utilized by the second spectrum holder.

4. The user equipment as claimed in claim 1, wherein the processor dynamically switches between the first mode and the second mode in response to receiving an indication that spectrum utilized by the second spectrum holder is freed and made available to the network operator, or that spectrum not utilized by the second spectrum holder is reclaimed for use by the second spectrum holder.

5. The user equipment as claimed in claim 1, wherein the processor switches from the second mode to the first mode if spectrum utilized by the second spectrum holder is freed and made available to the first spectrum holder.

6. The user equipment as claimed in claim 1, wherein the processor maintains operation in the second mode and increases bandwidth utilized for the second mode if spectrum utilized by the second spectrum holder is freed and made available to the first spectrum holder.

7. The user equipment as claimed in claim 1, wherein the RF transceiver is further capable of operating using simultaneous TDD and FDD operation, wherein the processor switches to simultaneous TDD and FDD operation if spectrum utilized by the second spectrum holder is freed and made available to the first spectrum holder.

8. The user equipment as claimed in claim 1, wherein the processor switches from operation in the first mode to the second mode if spectrum not utilized by the second spectrum holder is reclaimed for use by the second spectrum holder.

9. An article of manufacture comprising a non-transitory computer-readable storage medium having instructions stored thereon that, if executed by a processor, result in:
   controlling operation of a radio-frequency (RF) transceiver via time-division duplexing (TDD) in a first mode and controlling operation of the RF transceiver via frequency-division duplexing (FDD) in a second mode; and
   selecting the mode of operation of the RF transceiver based at least in part on the available spectrum not utilized by a primary spectrum holder (PSH);
   wherein the first mode is selected if there is a larger amount of uninterrupted available spectrum not utilized by the PSH.

10. The article of manufacture as claimed in claim 9, wherein the instructions, if executed, further result in selecting the second mode if there is a differing amount of available spectrum not utilized by the PSH.

11. The article of manufacture as claimed in claim 9, wherein the instructions, if executed, further result in selecting operating in a combination of the first mode and the second mode via carrier aggregation if a differing amount of available spectrum is not utilized by the PSH and a larger amount of uninterrupted spectrum is not utilized by the PSH.

12. The article of manufacture as claimed in claim 9, wherein the instructions, if executed, further result in dynamically switching between the first mode or the second mode as spectrum utilized by the PSH is freed and made available to the network operator, or as spectrum not utilized by the PSH is reclaimed for use by the PSH.

13. The article of manufacture as claimed in claim 9, wherein the instructions, if executed, further result in switching from the second mode to the first mode if spectrum utilized by the PSH is freed and made available to the network operator.

14. The article of manufacture as claimed in claim 9, wherein the instructions, if executed, further result maintaining operation in the second mode and increasing bandwidth utilized for the second mode if spectrum utilized by the PSH is freed and made available to the network operator.

15. A user equipment, comprising:
   a radio-frequency (RF) transceiver capable of operating via time-division duplexing (TDD) in a first mode and capable of operating via frequency-division duplexing (FDD) in a second mode; and
   a processor coupled to the RF transceiver for selecting a mode of operation of the RF transceiver to communicate with a first spectrum holder;
   the processor to select the mode of operation of the RF transceiver in response to available spectrum not utilized by a second spectrum holder other than the first spectrum holder;
   wherein the processor dynamically switches between the first mode and the second mode in response to receiving an indication that spectrum utilized by the second spectrum holder is freed and made available to the network operator, or that spectrum not utilized by the second spectrum holder is reclaimed for use by the second spectrum holder.

16. A user equipment, comprising:
   a radio-frequency (RF) transceiver capable of operating via time-division duplexing (TDD) in a first mode and capable of operating via frequency-division duplexing (FDD) in a second mode; and
   a processor coupled to the RF transceiver for selecting a mode of operation of the RF transceiver to communicate with a first spectrum holder;
   the processor to select the mode of operation of the RF transceiver in response to available spectrum not utilized by a second spectrum holder other than the first spectrum holder;
   wherein the processor switches from operation in the first mode to the second mode if spectrum not utilized by the second spectrum holder is reclaimed for use by the second spectrum holder.

17. An article of manufacture comprising a non-transitory computer-readable storage medium having instructions stored thereon that, if executed by a processor, result in:
   controlling operation of a radio-frequency (RF) transceiver via time-division duplexing (TDD) in a first mode and controlling operation of the RF transceiver via frequency-division duplexing (FDD) in a second mode;
   selecting the mode of operation of the RF transceiver based at least in part on the available spectrum not utilized by a primary spectrum holder (PSH); and
   operating the RF transceiver in a combination of the first mode and the second mode via carrier aggregation if a differing amount of available spectrum is not utilized by the PSH and a larger amount of uninterrupted spectrum is not utilized by the PSH.

18. An article of manufacture comprising a non-transitory computer-readable storage medium having instructions stored thereon that, if executed by a processor, result in:
   controlling operation of a radio-frequency (RF) transceiver via time-division duplexing (TDD) in a first mode and controlling operation of the RF transceiver via frequency-division duplexing (FDD) in a second mode;
   selecting the mode of operation of the RF transceiver based at least in part on the available spectrum not utilized by a primary spectrum holder (PSH); and
   dynamically switching the RF transceiver from the second mode to the first mode if spectrum utilized by the PSH is freed and made available to the network operator, or as spectrum not utilized by the PSH is reclaimed for use by the PSH.

* * * * *